United States Patent
Bodary et al.

(10) Patent No.: US 10,710,147 B2
(45) Date of Patent: Jul. 14, 2020

(54) METHOD OF MAKING AN AXLE

(71) Applicant: ArvinMeritor Technology, LLC, Troy, MI (US)

(72) Inventors: Andrew Bodary, Shelby Township, MI (US); Antonio Coletta, Windsor (CA); Jaw-Ping Pan, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 63 days.

(21) Appl. No.: 15/961,948

(22) Filed: Apr. 25, 2018

(65) Prior Publication Data

US 2019/0329316 A1 Oct. 31, 2019

(51) Int. Cl.
| | | |
|---|---|---|
| B21K 1/10 | (2006.01) | |
| B21J 7/14 | (2006.01) | |
| B21J 9/06 | (2006.01) | |
| B21K 1/06 | (2006.01) | |
| B21K 21/14 | (2006.01) | |
| B21D 19/00 | (2006.01) | |
| B21J 7/16 | (2006.01) | |

(52) U.S. Cl.
CPC .............. B21K 1/10 (2013.01); B21J 7/14 (2013.01); B21J 9/06 (2013.01); B21K 1/063 (2013.01); B21K 21/14 (2013.01); *B21D 19/00* (2013.01); *B21J 7/16* (2013.01); *B60B 2360/102* (2013.01); *Y10T 29/49828* (2015.01)

(58) Field of Classification Search
CPC .......... B21K 1/10; B21K 21/14; B21K 1/063; B21K 21/12; B21K 1/066; B21J 9/06; B21J 7/14; B21J 7/145; B21J 7/16; B21J 13/10; B21J 13/12; B60B 2360/102; B60B 35/14; B60B 2310/54; B60B 2310/228; B60B 2310/208; F16C 2220/46; F16C 3/02; B21D 53/88; B21D 19/00; Y10T 29/49622
See application file for complete search history.

(56) References Cited

U.S. PATENT DOCUMENTS

| | | | |
|---|---|---|---|
| 4,805,430 A | * | 2/1989 | Schmitz ............... B21D 39/203 29/523 |
| 5,950,785 A | | 9/1999 | Adachi et al. |
| 8,733,196 B2 | * | 5/2014 | Goppelsroder ....... F16H 57/029 74/421 A |

(Continued)

FOREIGN PATENT DOCUMENTS

| | | |
|---|---|---|
| EP | 2921320 A1 | 9/2015 |
| JP | 2009006338 A | 1/2009 |

(Continued)

OTHER PUBLICATIONS

European Patent Office, Extended European Search Report for corresponding European Application No. 19153948.5—1016, dated Aug. 9, 2019.

(Continued)

*Primary Examiner* — Sarang Afzali
(74) *Attorney, Agent, or Firm* — Brooks Kushman PC

(57) ABSTRACT

A one-piece axle and a method of manufacture. The method may include providing a one-piece axle blank that has a shaft and a flange. The shaft may have a hole that may extend along an axis. The flange may extend radially outward from an end of the shaft. The shaft may be radially forged against a first mandrel to axially elongate the shaft.

18 Claims, 6 Drawing Sheets

(56) References Cited

U.S. PATENT DOCUMENTS

| | | | |
|---|---|---|---|
| 9,109,635 | B2 | 8/2015 | Boothby et al. |
| 9,266,395 | B2* | 2/2016 | Maled .................. B60B 35/121 |
| 9,506,497 | B2* | 11/2016 | Khanfar ............... B60K 17/165 |
| 9,630,451 | B2* | 4/2017 | Pale ....................... B21D 19/00 |
| 2004/0060385 | A1* | 4/2004 | Prucher .................. B21C 37/16 |
| | | | 74/607 |
| 2015/0059945 | A1 | 3/2015 | Flory et al. |
| 2015/0285295 | A1 | 10/2015 | Khanfar et al. |
| 2018/0022154 | A1 | 1/2018 | Coletta et al. |

FOREIGN PATENT DOCUMENTS

| | | |
|---|---|---|
| JP | 2010260098 A | 11/2010 |
| KR | 20130013546 A | 2/2013 |
| WO | 2004024366 A1 | 3/2004 |

OTHER PUBLICATIONS

Disclosure Statement for U.S. Appl. No. 15/961,948, filed Apr. 25, 2018.

Arvinmeritor, Inc., Heavy-Duty Front Drive Steer Axles MX-140 and MX-160 Series, Maintenance Manual MM-0361, Copyright 2009 (revised Apr. 2010), 45 pages, Meritor® an ArvinMeritor brand, Troy, Michigan, USA.

India Search Report dated May 1, 2020 for related India Appln. No. 201914003522; 6 Pages.

\* cited by examiner

METHOD OF MAKING AN AXLE

TECHNICAL FIELD

This disclosure relates to a one-piece axle and a method of manufacture.

BACKGROUND

A multi-piece axle is disclosed in United States Patent Publication No. 2018/0022154.

SUMMARY

In at least one embodiment, a method of making an axle is provided. The method may include providing a one-piece axle blank that may have a shaft and a flange. The shaft may have a hole that may extend along an axis. The flange may extend radially outward from an end of the shaft. The shaft of the one-piece axle blank may be radially forged against a first mandrel to axially elongate the shaft.

In at least one embodiment, an axle is provided. The axle may have a shaft and a flange. The shaft may have a hole that may extend along an axis. The flange may extend radially outward from an end of the shaft. The flange may be integral with the shaft such that the axle is a one-piece component in which the flange is not a separate component that is attached to the shaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
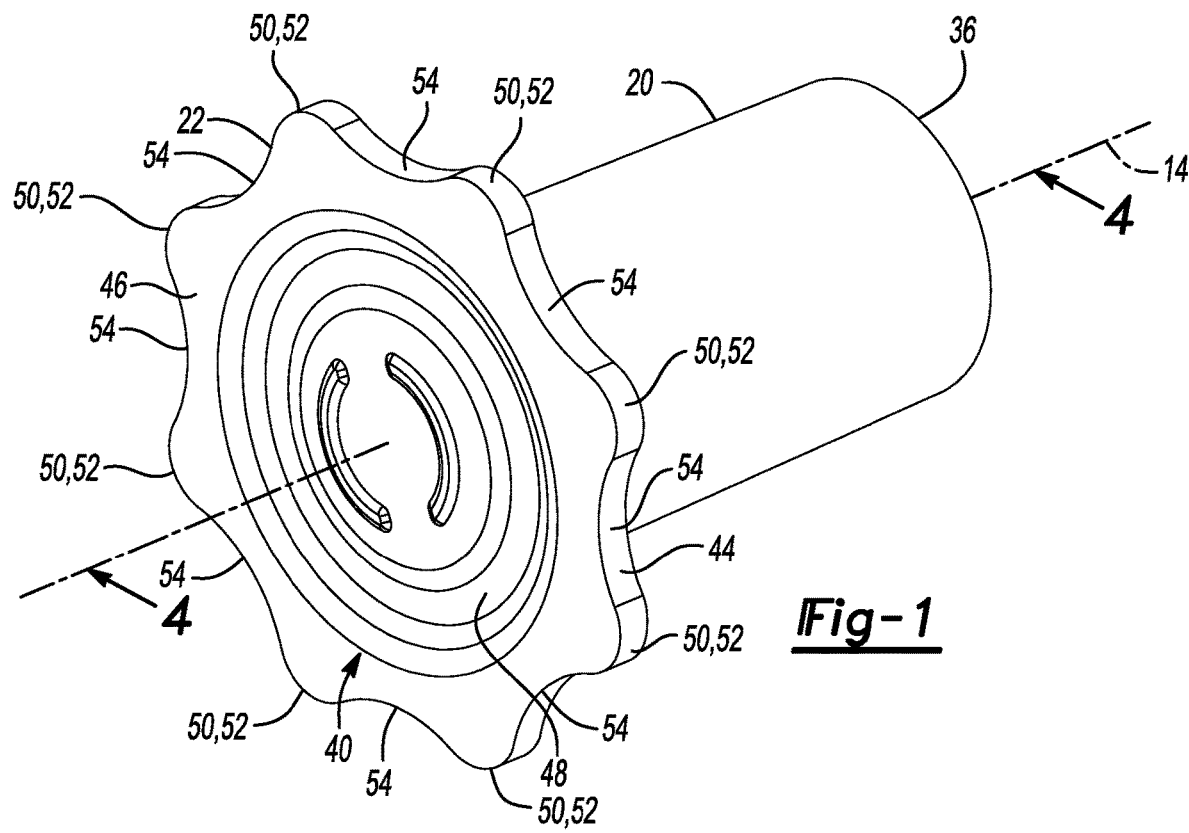
FIGS. 1 and 2 are perspective views of a one-piece axle blank.
Figure 2:
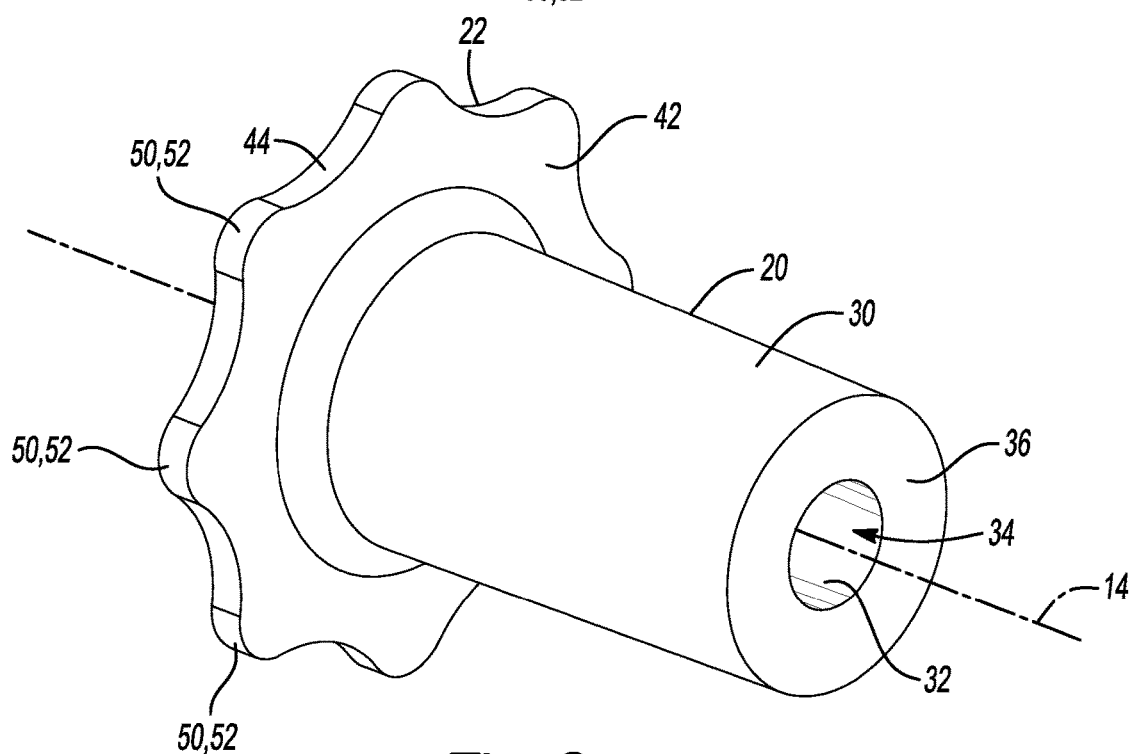
Figure 9:
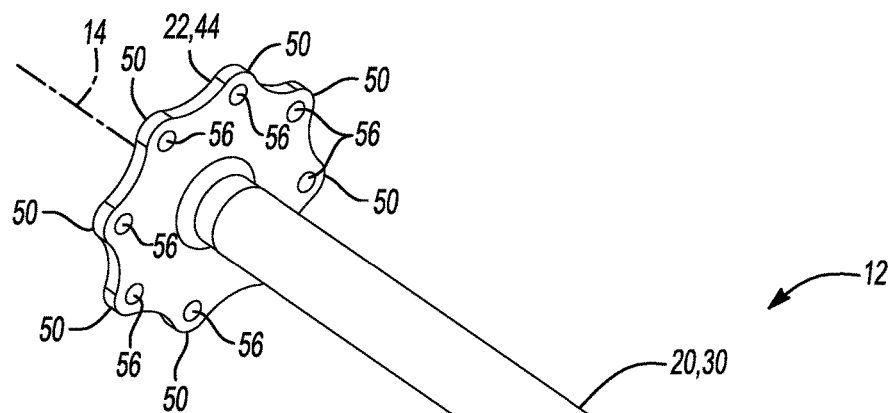
FIGS. 9 and 10 are perspective views of the one-piece axle of FIG. 8.
Figure 10:
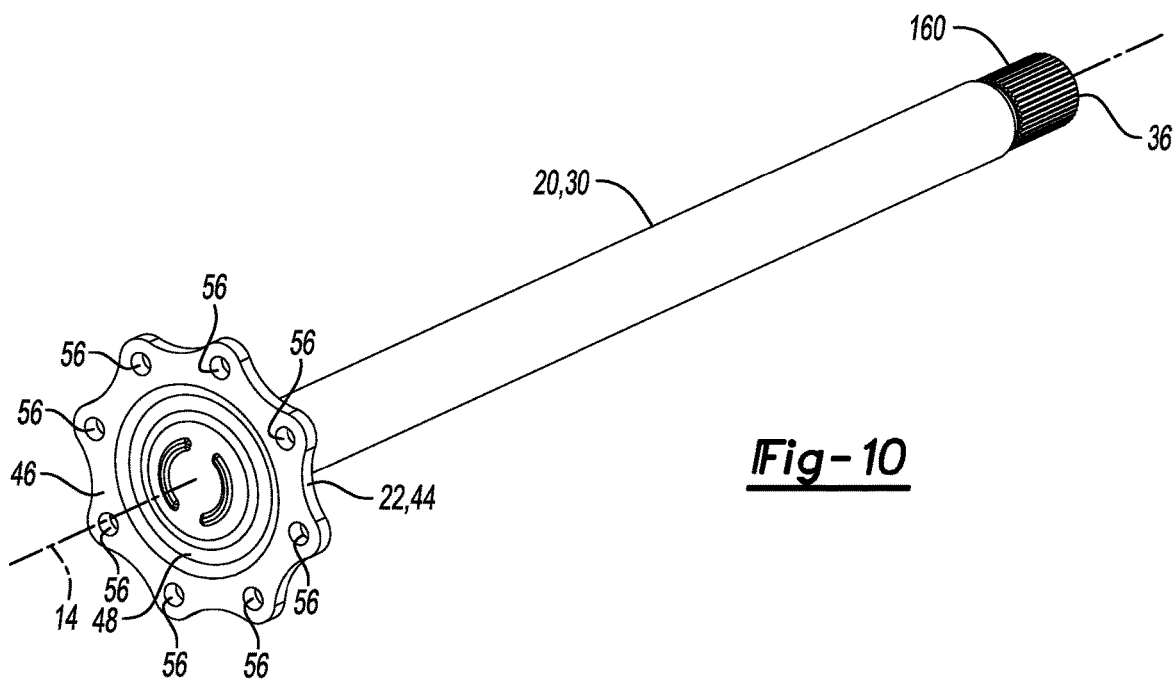

Referring to FIGS. 1 and 2, an example of a one-piece axle blank 10 is shown. The one-piece axle blank 10 may be manufactured into a one-piece axle 12, which is best shown in FIGS. 9 and 10. The one-piece axle 12 may be provided with an axle assembly that may be part of a motor vehicle like a truck, bus, farm equipment, military transport or weaponry vehicle, or cargo loading equipment for land, air, or marine vessels. For example, the one-piece axle 12 may operatively connect a differential assembly to a vehicle wheel. The one-piece axle blank 10 and the one-piece axle 12 may be disposed along and may be rotatable about an axis 14.

Figure 3:
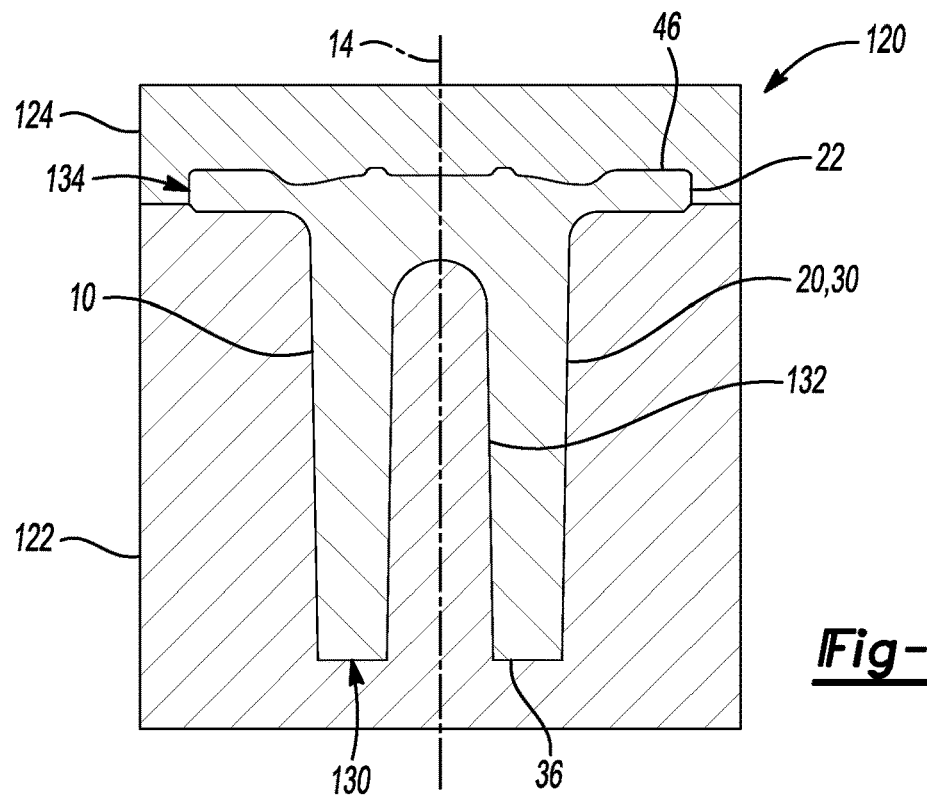
FIG. 3 is a section view of the one-piece axle blank being forged.

Referring to FIGS. 1-3, the one-piece axle blank 10 may be made of any suitable material. For example, the one-piece axle blank 10 may be made of a metal alloy like steel. In addition, the one-piece axle blank 10 may be forged from a single piece of material as will be discussed in more detail below. The one-piece axle blank 10 may include a shaft 20 and a flange 22.

The shaft 20 may have a generally cylindrical hollow configuration and may be centered about the axis 14. For instance, the shaft 20 may have an exterior surface 30, an interior surface 32, a hole 34, and an end surface 36.

Figure 6:
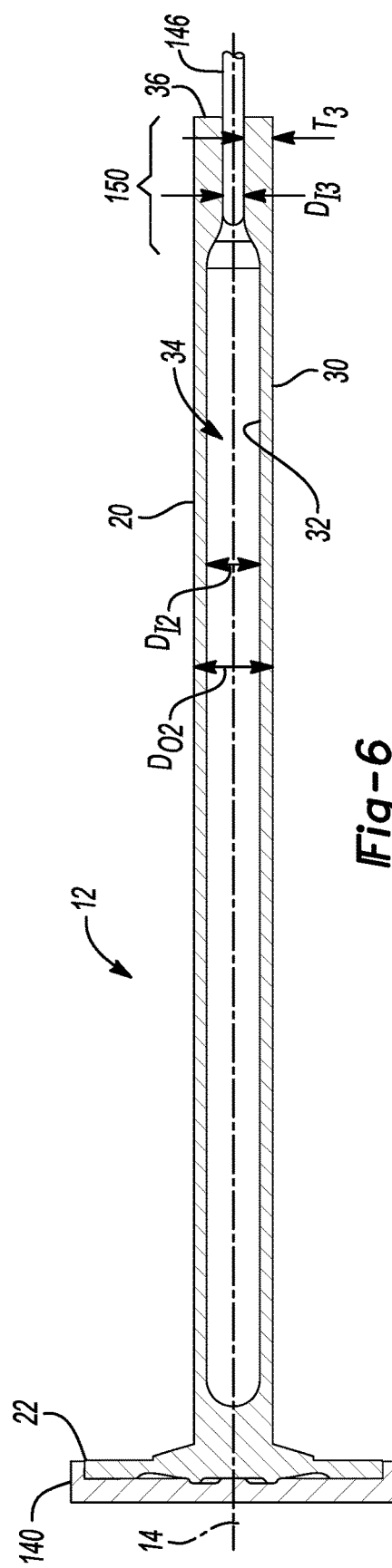
FIG. 6 is a section view of the one-piece axle blank after being radially forged against the second mandrel.
Figure 7:
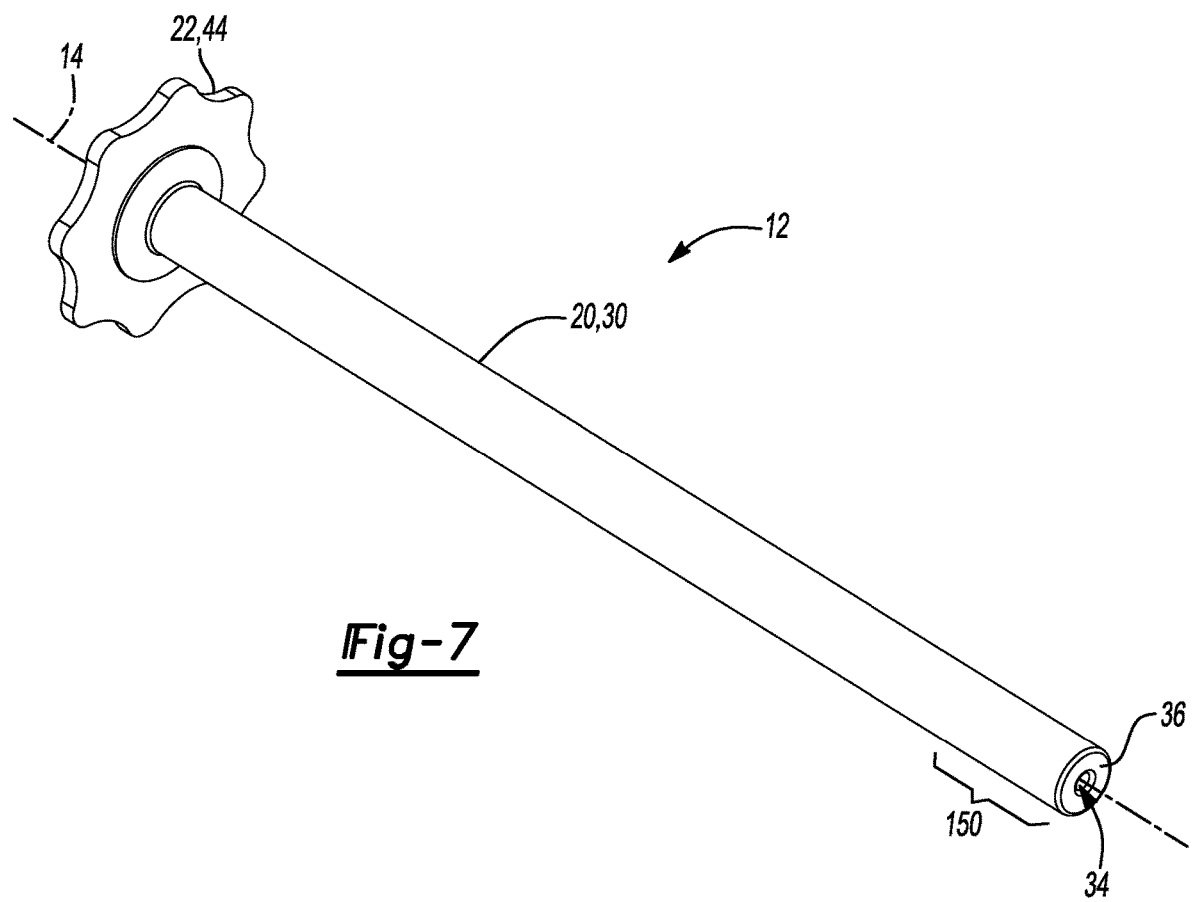
FIG. 7 is a perspective view of the one-piece axle of FIG. 6.
Figure 8:
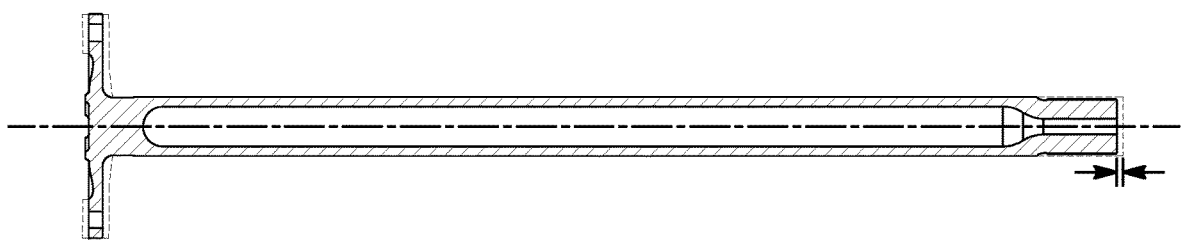
FIG. 8 is a section view of the one-piece axle after providing a spline and after material removal operations.

The exterior surface 30 may extend continuously around the axis 14 and may face away from the axis 14. The exterior surface 30 may extend from the flange 22 to the end surface 36. As is best shown in FIG. 3, the exterior surface 30 may have a tapered conical configuration prior to being radially forged in which the exterior surface 30 becomes closer to the axis 14 in a direction that extends away from the flange 22. As is best shown in FIG. 6, the exterior surface 30 may have a cylindrical or substantially cylindrical configuration after being radially forged.

The interior surface 32 may be disposed opposite the exterior surface 30 and may be spaced apart from the exterior surface 30. As such, the interior surface 32 may face toward the axis 14 and may be at least partially spaced apart from the axis 14. The interior surface 32 may extend from the end surface 36 toward the flange 22. As is best shown in FIG. 3, the interior surface 32 may have a tapered conical configuration prior to being radially forged in which the interior surface 32 becomes closer to the axis 14 in a direction that extends away from the end surface 36. In addition, the closed end of the interior surface 32 may have a substantially hemispherical shape. As is best shown in FIG. 6, the interior surface 32 may have multiple diameters after being radially forged. The interior surface 32 may at least partially define the hole 34.

The hole 34 may extend from the end surface 36 toward the flange 22. For example, the hole 34 may extend in an axial direction or a direction that extends along the axis 14 from the end surface 36 toward the flange 22 such that the hole 34 may not reach the flange 22. As such, the hole 34 may be a blind hole that may be spaced apart from the flange 22.

Referring to FIGS. 1 and 2, the end surface 36 may be disposed at an end of the shaft 20 that may be disposed opposite the flange 22. The end surface 36 may extend from the exterior surface 30 to the interior surface 32. In addition, the end surface 36 may be disposed substantially perpendicular to the axis 14 in one or more configurations.

The flange 22 may be extend from an end of the shaft 20 that may be disposed opposite the end surface 36. Moreover, the flange 22 is integral with the shaft 20 and is not a separate component that is attached to the shaft 20. The flange 22 may extend radially outward from the end of the shaft 20 or in a direction that may extend radially from or perpendicular to the axis 14. In at least one configuration, the flange 22 may include a first side 40, a second side 42, an outer surface 44, a ring 46, and a recess 48.

The first side 40 may be disposed opposite the end surface 36. As such, the first side 40 may face away from the end surface 36. In addition, the first side 40 or a portion thereof may be disposed substantially perpendicular to the axis 14.

The second side 42 may be disposed opposite the first side. As such, the second side 42 may face toward the shaft 20. The second side 42 or portion thereof may be disposed substantially perpendicular to the axis 14 or may be disposed parallel or substantially parallel to the first side 40. The second side 42 may extend from the exterior surface 30 of the shaft 20 to the outer surface 44.

The outer surface 44 may extend from the first side 40 to the second side 42. The outer surface 44 may extend continuously around the axis 14 and may face away from the axis 14. Moreover, the outer surface 44 may be disposed further from the axis 14 than the exterior surface 30 of the shaft 20. The outer surface 44 may extend parallel or substantially parallel to the axis 14. In at least one configuration, the outer surface 44 may have a variable diameter as will be discussed in more detail below.

The ring 46 may be provided on the first side 40 of the flange 22. The ring 46 may extend radially inward from the outer surface 44 toward the axis 14 and to the recess 48. As such, the ring 46 may be a portion of the flange 22 that may extend around the recess 48. The ring 46 may have a substantially constant thickness from the first side 40 to the second side 42. In at least one configuration, the ring 46 may include a plurality of lobes 50.

The lobes 50 may protrude radially outward with respect to the axis 14 and the recess 48. The lobes 50 may be provided in a repeating pattern or a repeating arrangement around the axis 14. In the configuration shown, eight lobes 50 are provided; however, it is contemplated that a greater or lesser number of lobes 50 may be provided. In a configuration having an even number of lobes 50, each lobe 50 may be disposed directly opposite another lobe 50 along a diametrical line that may extend through the axis 14 and perpendicular to the axis 14. Each lobe 50 may have a peak 52. The peak 52 may be a location or region of the outer surface 44 that is disposed furthest from the axis 14. A trough 54 may be disposed between adjacent lobes 50. The trough 54 may be a location or region of the outer surface 44 that is disposed closest to the axis 14. As such, the outer surface 44 may have a serpentine or undulating configuration as of extends around the axis 14.

As is best shown in FIGS. 1 and 2, each lobe 50 of the one-piece axle blank 10 may be free of holes. As is best shown in FIGS. 9 and 10, each lobe 50 of the one-piece axle 12 may have a lug hole 56 that may extend through each lobe 50. Each lug hole 56 may receive a wheel mounting lug that may facilitate mounting of a vehicle wheel to the one-piece axle 12. A lug nut may be threaded onto each wheel mounting lug to secure the wheel to the flange 22 of the one-piece axle 12 between the lug nut and the flange 22.

The recess 48 may be disposed on the first side 40 of the flange 22. The recess 48 may extend radially inward from the ring 46 to the axis 14. In addition, the recess 48 may extend axially from the ring 46 toward the shaft 20. As such, the recess 48 may be disposed opposite the shaft 20.

Figure 11:
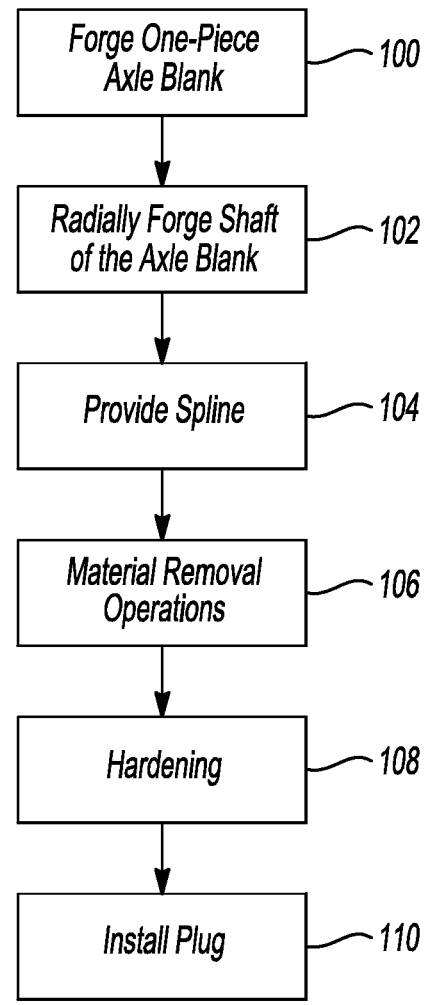
FIG. 11 is a flowchart of a method of making a one-piece axle.

Referring to FIG. 11, a flowchart of a method of making an axle is shown. Steps associated with the method are illustrated with reference to FIGS. 3-10.

At block 100, the one-piece axle blank 10 may be forged. The one-piece axle blank 10 may be forged using a forging die set 120, an example of which is illustrated in FIG. 3. The forging die set 120 may receive and forge a single piece of material into the one-piece axle blank 10 having the shaft 20 that extends from and is integrally formed with the flange 22. For instance, a bar of material, such as steel, may be cut to a predetermined length that provides a sufficient volume to form the one-piece axle blank 10. Although a single forging die set 120 is shown, it is also contemplated that multiple die sets may be employed to forge the single piece of material into the one-piece axle blank 10 using a sequence of forging steps.

The forging die set 120 may include a first die 122 and a second die 124. The first die 122 and the second die 124 may be disposed in a first press that may actuate the first die 122, the second die 124, or both, along the axis 14 to compress and forge the single piece of material in a manner known by those skilled in the art.

The first die 122 may primarily form the shaft 20. In at least one configuration, the first die 122 may have a first die cavity 130 that may be configured to receive the single piece of material. In the orientation shown, the first die cavity 130 may extend from an upper surface of the first die 122 that may face toward the second die 124 to a bottom surface that may form the end surface 36. A forming shaft 132 may be received in the first die cavity 130 and may extend upward from a bottom surface of the first die 122. The shaft 20 may be formed around the forming shaft 132. As such, the forming shaft 132 may form the hole 34 in the shaft 20.

The second die 124 may cooperate with the first die 122 to form the flange 22. In at least one configuration, the second die 124 may have a second die cavity 134 that may face toward first die cavity 130 of the first die 122 to provide space for forging the flange 22. The flange 22 may be formed in the second die cavity 134 between the first die 122 and the second die 124.

Figure 4:
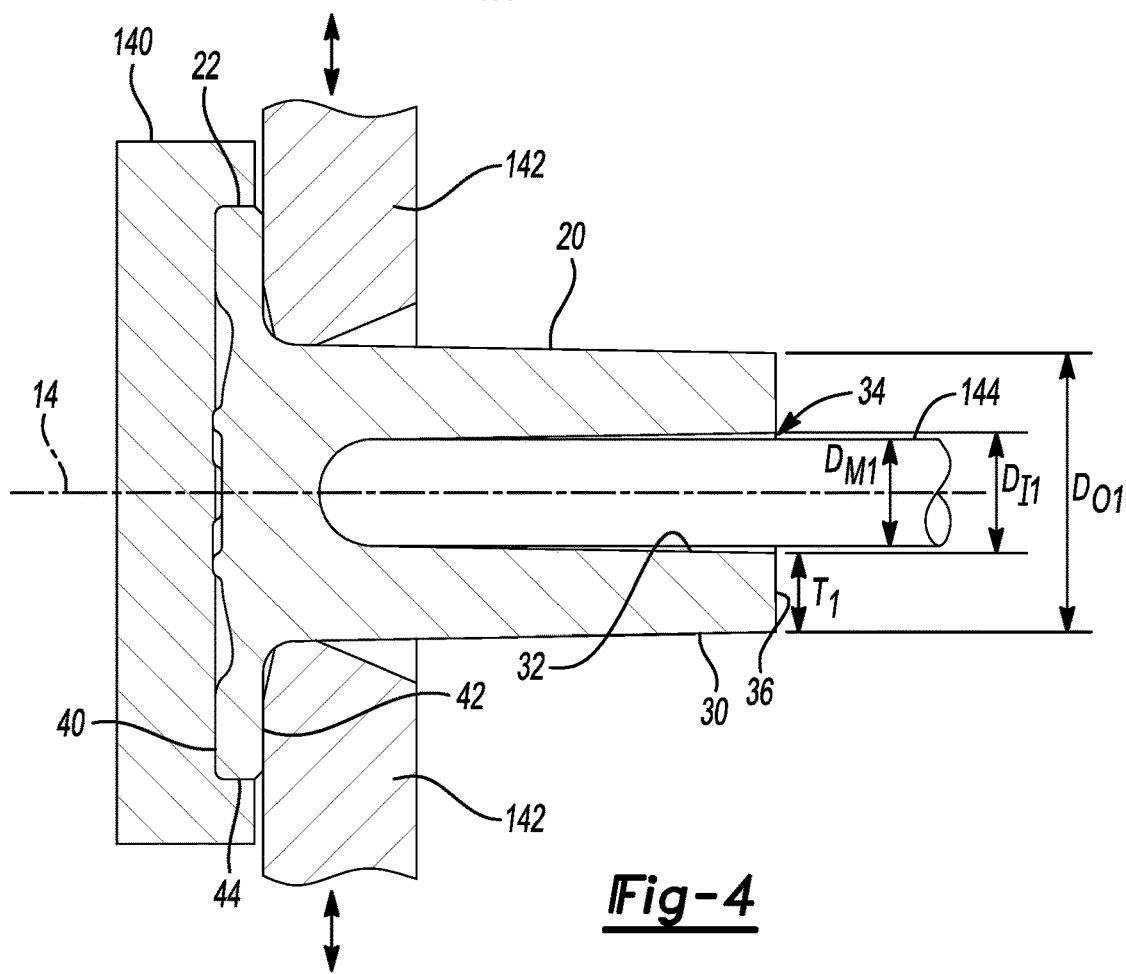
FIG. 4 is a section view of the one-piece axle blank being radially forged against a first mandrel.
Figure 5:
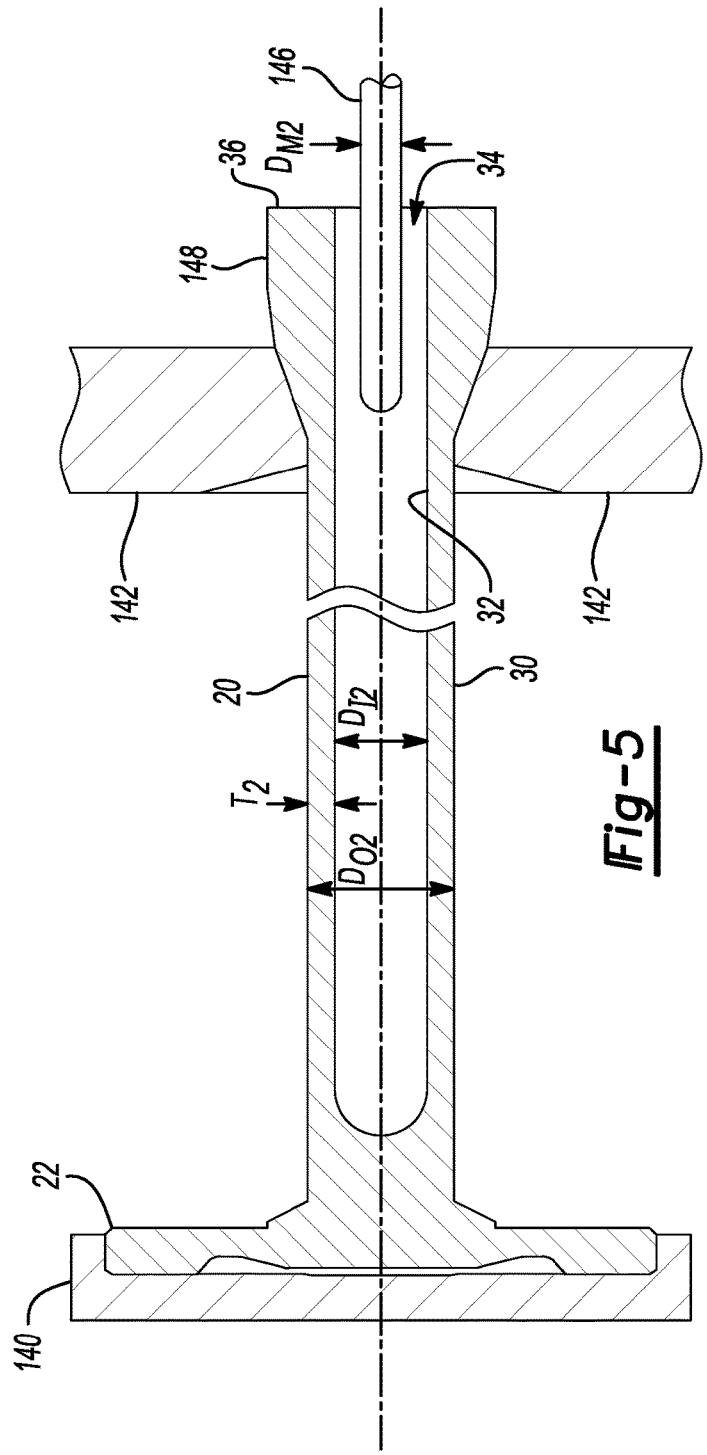
FIG. 5 is a section view of the one-piece axle blank prior to being radially forged against a second mandrel.

At block 102, the shaft 20 of the one-piece axle blank 10 may be radially forged or swaged to lengthen and shape the shaft 20 as well as to change its material thickness. Swaging or radial forging is a forming process in which a workpiece is forged or reduced to a desired size or shape by dies that exert compressive forces, such as with a succession of rapid blows from a plurality of hammers or dies that impact and act around the circumference or perimeter of the workpiece. Swaging or radial forming is typically a cold working process and is suitable for forming workpieces that have a symmetrical cross section. Swaging or radial forming may be performed using a swaging or radial forging equipment, such as a radial forging machine. Such equipment may include a gripper 140, a plurality of hammers or dies 142, and a first mandrel 144, which are best shown in FIGS. 4 and 5. In addition, the equipment may include a second mandrel 146 which is best shown in FIGS. 5 and 6.

Referring to FIG. 4, the gripper 140 may grasp and hold the flange 22. As such, the flange 22 may not rotate with respect to the gripper 140 and the flange 22 may not be forged by the radial forging machine, such as when the shaft 20 is radially forged. As such, the flange 22 may be completely forged before the shaft 20 is radially forged.

The first mandrel 144 may be inserted into the hole 34 of the shaft 20. Moreover, the first mandrel 144 may be inserted such that the end of the first mandrel 144 to contact the end of the hole 34. The first mandrel 144 may extend along the axis 14 and may have a cylindrical or substantially cylindrical configuration. In addition, the first mandrel 144 may have an outside diameter $D_{M1}$ that may be less than the diameter of the hole 34.

Next, the dies 142 may impact and exert compressive forces on the exterior surface 30 of the shaft 20. The compressive forces may be exerted in a radial direction that extends toward the axis 14 so that the interior surface 32 of the shaft 20 may be radially forged against the first mandrel 144. The dies 142 may or may not rotate about an axis 14 with respect to the shaft 20 depending on the design of the swaging or radial forging machine. Similarly, the shaft 20 may or may not rotate about the axis 14 with respect to the dies 142 in various configurations.

The dies 142 may strike the exterior surface 30 of the shaft 20 simultaneously or with alternating blows. The dies 142 may be positioned opposite each other when an even number of dies is employed. Alternatively, dies 142 may be angularly offset from each other when and odd number of dies is employed.

As is best shown by comparing FIGS. 4 and 5, the compressive forces exerted by the dies 142 may reduce the wall thickness of the shaft 20 from the exterior surface 30 to the interior surface 32. For instance, the shaft 20 may have a wall thickness $T_1$ at the end surface 36 prior to radial forging as shown in FIG. 4 (and may have an increasing wall thickness in a direction that extends axially toward the flange 22). After radial forging, the wall thickness may be reduced to wall thickness $T_2$ as shown in FIG. 5. As an example, the wall thickness $T_2$ may be approximately 0.354 inches (0.9 cm). In addition, radial forging may reduce the outside diameter and the inside diameter of the shaft 20. For example, the shaft 20 may have an outside diameter $D_{O1}$ and an inside diameter $D_{I1}$ at the end surface 36 prior to radial forging as shown in FIG. 4. After radial forging, that radially forged portion of the shaft 20 may have an outside diameter $D_{O2}$ and an inside diameter $D_{I2}$ that is less than $D_{O1}$ and $D_{I1}$, respectively, as shown in FIG. 5. As an example, the outside diameter $D_{O2}$ may be approximately 2.205 inches (5.6 cm) and the inside diameter $D_{I2}$ may be approximately 1.5 inches (3.8 cm). The inside diameter $D_{I2}$ may also be a diameter of the hole 34 after radial forging against the first mandrel 144.

As is best shown by comparing FIGS. 4 and 5, the dies 142 may move axially with respect to the shaft 20 or vice versa to form the shaft 20 along its axial length. This relative axial movement may axially elongate the shaft 20 and push the end surface 36 away from the flange 22. Moreover, the dies 142 may push material along the side of the dies 142 that faces away from the flange 22, resulting in an enlarged area or bulge 148 between the dies 142 and the end surface 36.

Radial forging may be paused at the position shown in FIG. 5 to permit the first mandrel 144 to be removed from the hole 34 and be replaced with the second mandrel 146. The second mandrel 146 may be inserted partially into the hole 34 of the shaft 20, such as just through the bulge 148. As such, the end of the second mandrel 146 may be spaced apart from the shaft 20 in one or more configurations. In addition, the second mandrel 146 may be spaced apart from the shaft 20 prior to resuming radial forging. The second mandrel 146 may extend along the axis 14 and may have a cylindrical or substantially cylindrical configuration.

The second mandrel 146 may have a smaller diameter than the first mandrel 144. For instance, the second mandrel 146 may have an outside diameter $D_{M2}$ that may be less than the outside diameter $D_{M1}$ of the first mandrel 144. As a result, the second mandrel 146 may allow an end portion 150 of the shaft 20, which is best shown in FIG. 6, to be provided with a greater wall thickness than the portion of the shaft 20 that was radially forged using the first mandrel 144. The end portion 150 may extend in an axial direction from the end surface 36 toward the flange 22.

Referring to FIG. 6, radial forging may resume after the second mandrel 146 has been partially inserted into the hole 34 to radially forge the end portion 150 against the second mandrel 146 to reduce the diameter of the hole 34 in the end portion 150 from diameter $D_{I2}$ to diameter $D_{I3}$. As such, the hole 34 may have a larger diameter $D_{I2}$ between the flange 22 and the end portion 150 than inside the end portion 150. The end portion 150 may have a wall thickness $T_3$ that may be greater than the wall thickness $T_2$ of the portion of the shaft 20 that was radially forged against the first mandrel 144 but not radially forged against the second mandrel 146. Moreover, the end portion 150 may be radially forged such that the shaft 20 may have a substantially constant outside diameter $D_{O2}$ between the flange 22 and the end surface 36. The second mandrel 146 may then be removed from the hole 34 and the radially forged one-piece axle 12 may be released from the gripper 140 and removed from the radial forging machine, thereby resulting in the configuration shown in FIG. 7.

At block 104, a spline 160 may be provided on the end portion 150 after the shaft 20 and the end portion 150 have been radially forged. The spline 160 is best shown with reference to FIGS. 8-10. Horizontal dashed lines are used in FIG. 8 to illustrate differences between FIG. 6, in which the spline 160 has not been provided, and FIG. 8, in which the spline 160 has been provided. The spline 160 may be formed in any suitable manner. For instance, the spline 160 may be formed by roll forming the end portion 150 or by removing material from the exterior surface 30 of the end portion 150 to provide a plurality of spline teeth that may be arranged around the axis 14. The spline teeth may extend substantially parallel to the axis 14 and may extend from the end surface 36 toward the flange 22.

At block 106, material removal operations may be performed. Such material removal operations are best illustrated with reference to FIG. 8, in which dashed lines are used to illustrate areas where material may be removed. Material removal operations may include removing material from the first side 40 of the flange 22, removing material from the second side 42 of the flange 22, removing material from the end surface 36, drilling a lug hole 56 through each lobe 50, or combinations thereof. Removing material from the end surface 36 may allow the shaft 20 of a one-piece axle 12 to be provided with a desired axial length or predetermined axial length. For example, the shaft 20 may be forged with a nominal axial length and then different amounts of material may be removed from the end surface 36 to provide one-piece axles 12 having different axial lengths. As such, a common forging process may be employed to make multiple axles having substantially the same configuration while the amount of material removed from the shaft 20 may vary to provide different finished axle lengths from such common forging configurations.

Removing material from the first side 40 of the flange 22 may be accomplished in any suitable manner, such as by cutting, facing, or milling the ring 46, thereby providing a substantially planar surface for engagement with a vehicle wheel. Material may not be removed from the recess 48.

Removing material from the second side 42 of the flange 22 may be accomplished in any suitable manner, such as by cutting, facing, or milling the second side 42 from the outer surface 44 of the flange 22 toward or to the exterior surface 30 of the shaft 20, thereby providing a substantially planar surface for contacting the head of a wheel mounting lug.

The lug holes 56 may be drilled after removing material from the first side 40 and the second side 42 in one or more configurations.

Removing material from the end surface 36 may be accomplished in any suitable manner, such as by cutting, facing, or milling the end surface 36 to provide a desired length and a smooth surface that may facilitate coupling of the spline 160 with a corresponding spline on another component, such as a differential assembly. Removing material from the end surface 36 may be omitted in one or more configurations.

At block 108, the axle or a portion thereof may be hardened. For example, a portion of the shaft 20, such as the end portion 150 and the spline 160 may be induction hardened or quench hardened to increase the hardness of the spline 160 and optionally to harden adjacent areas of the shaft 20. Moreover, it may be possible to not harden or heat treat the shaft along its entire axial length. Hardening may be performed after the spline 160 is provided to facilitate manufacturing and reduce cutting tool wear. In addition, hardening may be performed after removing material from the end surface 36.

At block 110, a plug 170 may be installed in the end portion 150. The plug 170 is best shown in FIG. 9. The plug 170 may be installed in the hole 34 to seal the hole 34 and to prevent contaminants from entering the hole 34 in the shaft 20. Contaminants in the hole 34 may otherwise lead to corrosion of the shaft 20 and reduced axle life. The plug 170 may be located adjacent to the end surface 36 in one or more embodiments. In addition, the plug 170 may extend partially through the end portion 150. The plug 170 may be secured in any suitable manner, such as with an adhesive or other bonding technique or medium, an interference fit, or by welding. The plug 170 may be installed after hardening in one or more embodiments.

Providing a one-piece axle as described above may allow an axle to be made of a single piece of material, which may eliminate manufacturing and assembly steps as compared to a multi-piece axle design. For instance, assembly steps such as welding a flange to a shaft or providing fasteners or mating splines that may join a flange to a shaft may be eliminated as well as the equipment associated with performing such assembly and fabrication steps. Moreover, gaps or potential leak paths between separate axle components may be eliminated with a one-piece design, which may help improve durability and eliminate gaps or openings that may lead to corrosion or that may reduce the strength of the axle. A one-piece axle may be stronger or more durable than a multi-piece axle or solid axle shaft designs in various configurations. For example, providing a one-piece axle with a hollow shaft may provide a higher torsional section strength as compared to solid shaft designs having diameters ranging from 1.88 to 2.0 inches (47.75 to 50.8 cm). Such torsional strength may allow a single hollow shaft configuration to replace different solid axle shafts having these different diameters, which may provide improved economies of scale. A one-piece axle may also allow an axle to be made with a hole in the shaft to reduce weight of the axle, which in turn may reduce the weight of an associated axle assembly and may help improve vehicle fuel economy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making an axle comprising:
    forging a one-piece axle blank that is a single piece of material and has a shaft that extends from and is integrally formed with a flange using a forging die set that includes a first die having a forming shaft that is received in a first die cavity and a second die having a second die cavity, wherein the shaft is formed in the first die around the forming shaft thereby forming a hole in the shaft that extends along an axis, and the flange is formed in the second die cavity between the first die and the second die, wherein the flange extends radially outward from an end of the shaft and the shaft is completely disposed in the first die; and
    radially forging the shaft against a first mandrel to axially elongate the shaft.

2. The method of claim 1 further comprising radially forging an end portion of the shaft that extends from an end surface that is disposed opposite the flange against a second mandrel, which has a smaller outside diameter than the first mandrel, after radially forging the shaft against the first mandrel.

3. The method of claim 2 wherein radially forging the end portion of the shaft against the second mandrel reduces a diameter of the hole in the end portion such that the hole has a larger diameter between the flange and the end portion and the shaft has a substantially constant outside diameter between the flange and the end surface.

4. The method of claim 3 further comprising providing a spline on the end portion after radially forging the end portion.

5. The method of claim 4 further comprising removing material from a first side of the flange that faces away from the end surface and removing material from a second side of the flange that is disposed opposite the first side.

6. The method of claim 5 wherein removing material from the first side of the flange includes removing material from a ring that extends continuously around a recess that extends from the axis to the ring without removing material from the recess.

7. The method of claim 6 wherein the ring has a plurality of lobes that protrude radially outward from the axis.

8. The method of claim 7 further comprising drilling a lug hole through each lobe after removing material from the first side and the second side of the flange.

9. The method of claim 5 wherein removing material from the second side of the flange includes removing material along the second side from an outer surface of the flange that faces away from the axis to the shaft.

10. The method of claim 4 further comprising hardening the spline.

11. The method of claim 10 further comprising removing material from the end surface prior to hardening the spline.

12. The method of claim 10 further comprising installing a plug in the end portion to seal the hole after hardening the spline.

13. The method of claim 2 wherein
    the first mandrel is removed from the hole after radially forging the shaft against the first mandrel and the second mandrel is inserted into the hole after the first mandrel is removed.

14. The method of claim 13 wherein radially forging the end portion of the shaft against the second mandrel reduces a diameter of the hole in the end portion such that the hole has a larger diameter between the flange and the end portion and the shaft has a substantially constant outside diameter between the flange and the end surface.

15. The method of claim 1 wherein the flange has an outer surface that faces away from the axis, a ring that extends from the outer surface toward the axis, and a recess that extends radially inward from the ring to the axis and that extends axially from the ring toward the shaft.

16. The method of claim 15 wherein the flange includes a plurality of lobes that protrude radially outward with respect to the recess, wherein the lobes are provided in a repeating pattern around the axis.

17. The method of claim 1 wherein radially forging the shaft against the first mandrel reduces a diameter of the hole and reduces a wall thickness of the shaft.

18. The method of claim 1 wherein the flange is secured in a gripper when the shaft is radially forged such that the flange is not forged when the shaft is radially forged.

* * * * *